Patented Aug. 13, 1946

2,405,863

UNITED STATES PATENT OFFICE 2,405,863

DICYANODIAMIDE-AMMONIA CONDENSATION PRODUCTS AND PROCESS FOR MAKING SAME

Jules Treboux, Riehen, near Basel, Switzerland, assignor to the firm J. R. Geigy A. G., Basel, Switzerland No Drawing. Application March 25, 1943, Serial No. 480,567. In Switzerland June 22, 1942

1 Claim. (Cl. 260—69)

It has been found that valuable new condensation products are obtained by condensing 1 molecular proportion of dicyanodiamide and at least 1 molecular proportion of ammonia, which is present partly in form of urea and partly in form of a mineral acid ammonium salt, with at least 2 molecular proportions of formaldehyde. Instead of ammonia, amines with primary or secondary amino groups may also be used; among theureas coming into question it is advantageous to use those which contain at least one replaceable hydrogen atom at a nitrogen atom. Instead of the dicyanodiamide and of the ureas, it is also possible to wholly or partly use quite well compounds obtainable by interaction from both the said compounds, such as for example ammeline and derivatives. The same is the case for the couple: dicyanodiamide plus ammonium salts. Instead of the latter compounds reaction products of these components may wholly or partly be used, e. g. biguanides, but also compounds which are converted into biguanides under the said reaction conditions. Instead of the ammonium salts, the ureas used can be previously hydrolysed by means of mineral acids, thus producing, as is known, mineral acid ammonium salts, while splitting off carbon dioxide; of course, the latter method is technically much less advantageous.

The new condensation products which serve for improving the fastness properties of direct-dyeings by after-treatment of the dyeings, are obtained in form of bright resins which are soluble in water and acids. The best way consists in that the resulting reaction solutions, if necessary after the addition of acid or after having suitably been diluted, are directly employed.

However, it is already known that the fastness properties of direct-dyeings can be improved by after-treatment with condensation products of aminotriazine with aldehyde. By such a treatment there results a deterioration of the light-fastness which may be removed by an after-treatment of the dyeings with copper-salts. Contrarily thereto the condensation products obtainable according to the present invention possess the advantage that they do not unfavourably influence the light-fastness of the direct-dyeings thus treated and that an after-treatment with copper-salts is superfluous, which after-treatment cannot be carried out with dyestuffs which are sensitive to copper. Furthermore, any heating of the dyed and after-treated goods, which is necessary when using similar after-treating agents in order to obtain the complete condensation of the used and low condensed condensation products, is superfluous in the present case, which fact represents a substantial simplification and reduction of the costs of the process. Besides, generally weaker concentrations of the treating baths will suffice than when working with the above-mentioned similar comparison products.

The present invention is illustrated by the following examples, wherein the parts are by weight. Of course, this invention must not be understood as being limited to the following examples.

Example 1

17 parts of dicyanodiamide, 12 parts of urea and 30 parts of 30% hydrochloric acid are refluxed during 6 hours. Then, at 30° C., 50 parts of 30% formaldehyde are added thereto, the mixture is stirred for 6 hours at 75°–85° C. and treated with 10 parts of glacial acetic acid. This solution may be added directly to the after-treating baths used for direct-dyeings.

When the quantity of the urea used is decreased, e. g., down to 6 parts, final products with similar properties are obtained which, however, show somewhat inferior activity for after-treating direct-dyeings.

Example 2

34 parts of dicyanodiamide, 18 parts of urea, 5.5 parts of ammonium chloride, 75 parts of water and 45 parts of 30% hydrochloric acid are boiled under reflux for 6 hours, then 80 parts of formaldehyde of 37.4% strength are added and the whole is heated for 6 hours to 75°–85° C. After completion of the condensation the solution is treated with 10 parts of glacial acetic acid.

If the quantity of the formaldehyde is reduced to 64 parts or the quantity of aldehyde increased to 160 parts, final products with almost identical properties are obtained; in the latter case it is preferable to condense for a longer time.

Example 3

The procedure indicated in Example 2 is followed, but with the modification that there are used 12 parts of urea and 11 parts of ammonium chloride. The properties of the final product are identical.

Example 4

Condensation is carried out as described in Example 2, but there are used 6 parts of urea and 16 parts of ammonium chloride. An identical product is thus also obtained.

Example 5

17 parts of dicyanodiamide, 11 parts of ammonium chloride and 60 parts of water are boiled under reflux for 6 hours. Separately 17 parts of dicyanodiamide, 12 parts of urea and 60 parts of 15% hydrochloric acid are refluxed. Then both solutions are combined, whereupon 80 parts of 37.4% formaldehyde are added thereto and the mixture is heated for 6 hours to 75°-85° C. The solution thus obtained possesses the same properties as that produced according to Example 1.

Example 6

34 parts of dicyanodiamide in 60 parts of 15% hydrochloric acid are boiled under reflux for 6 hours. A solution of 24 parts of urea and 60 parts of hydrochloric acid of 15% strength is added thereto, which solution has been previously treated in the same manner. Then the mixture is treated with 100 parts of 30% formaldehyde and heated to 75°-85° C., until the condensation has completed, that is to say for about 6 hours.

Example 7

34 parts of dicyanodiamide, 24 parts of urea, 200 parts of water and 52 parts of 93% sulfuric acid are boiled under reflux for 6 hours and, after the addition of 80 parts of 37.4% formaldehyde, completely condensed at 75°-85° C. during further 6 hours. Finally still 10 parts of glacial acetic acid are added.

Example 8

34 parts of dicyanodiamide, 12 parts of urea and 11 parts of ammonium chloride are added to 120 parts of water, the whole is heated to boiling for 12 hours, then treated with 80 parts of 37.4% formaldehyde and the condensation completed by heating the mixture for 6 hours to 80° C.

What I claim is:

A process for the manufacture of an acid soluble condensation product from dicyanodiamide, urea, ammonium chloride and formaldehyde, which comprises boiling for several hours substantially one mol of dicyanodiamide with at most one mole of urea in presence of hydrochloric acid, whereby the urea is partly hydrolyzed to $NH_4Cl$, adding at least two mols of formaldehyde and condensing at 75°-85° C.

JULES TREBOUX.